(12) United States Patent
Young et al.

(10) Patent No.: US 11,174,030 B2
(45) Date of Patent: Nov. 16, 2021

(54) TRAY TABLE AIRBAG ASSEMBLY

(71) Applicant: Key Safety Systems, Inc., Sterling Heights, MI (US)

(72) Inventors: Jeffrey Young, Bruce Township, MI (US); Pat O'Mara, Chesterfield Township, MI (US)

(73) Assignee: KEY SAFETY SYSTEMS, INC., Sterling Heights, MI (US)

( * ) Notice: Subject to any disclaimer, the term of this patent is extended or adjusted under 35 U.S.C. 154(b) by 80 days.

(21) Appl. No.: 16/097,006

(22) PCT Filed: Jun. 9, 2017

(86) PCT No.: PCT/US2017/036776
§ 371 (c)(1),
(2) Date: Oct. 26, 2018

(87) PCT Pub. No.: WO2017/214519
PCT Pub. Date: Dec. 14, 2017

(65) Prior Publication Data
US 2019/0144121 A1    May 16, 2019

Related U.S. Application Data

(60) Provisional application No. 62/348,566, filed on Jun. 10, 2016.

(51) Int. Cl.
*B64D 11/06* (2006.01)
*B60R 21/207* (2006.01)
(Continued)

(52) U.S. Cl.
CPC ........ *B64D 11/06205* (2014.12); *B60N 3/004* (2013.01); *B60R 21/207* (2013.01);
(Continued)

(58) Field of Classification Search
CPC .... B60R 2021/0093; B60R 2021/2173; B60R 21/16; B60R 2021/0273; B60R 21/207;
(Continued)

(56) References Cited

U.S. PATENT DOCUMENTS 2,418,798 A * 4/1947 Whitmer ................ B64D 25/00
244/121
2,873,122 A * 2/1959 Peras ..................... B60R 21/02
280/29

(Continued)

FOREIGN PATENT DOCUMENTS

EP         0168806 A1    1/1986
JP        H02212239 A    8/1990
(Continued)

*Primary Examiner* — Paul N Dickson
*Assistant Examiner* — Timothy Wilhelm
(74) *Attorney, Agent, or Firm* — Meunier Carlin & Curfman LLC (57) ABSTRACT

A system for increasing passenger safety within an airplane (10) includes a forward seat (16) having a back surface (17) that faces an occupant seat (14). A tray table holder (22) is secured to or formed integrally with the back of the forward seat (16). A tray table (20) is rotatably connected to the tray table holder via a hinge (40) and is rotatable relative to the tray table holder. The tray table defines a cavity (32) inside the tray table. An airbag (54) is within the cavity. An inlet device (42) is coupled to the airbag and is rotatable about the hinge (40) such that the inflator inlet can rotate as the tray table rotates relative to the tray table holder. An inflator (52) is connected to the inlet device and is configured to deliver gas to the airbag through the inflator inlet.

12 Claims, 9 Drawing Sheets

(51) Int. Cl.
   *B60N 3/00*    (2006.01)
   *B60R 21/00*   (2006.01)
(52) U.S. Cl.
   CPC ...... *B64D 11/0605* (2014.12); *B64D 11/0638* (2014.12); *B60R 2021/0093* (2013.01)
(58) Field of Classification Search
   CPC ........ B64D 11/06205; B64D 11/06388; B64D 11/0605; B60N 3/004
   See application file for complete search history.

(56) References Cited

U.S. PATENT DOCUMENTS

| | | | | |
|---|---|---|---|---|
| 3,173,722 A * | | 3/1965 | Carbonetti | B60N 2/99 297/423.17 |
| 3,198,543 A * | | 8/1965 | Presunka | B60R 21/02 280/751 |
| 3,420,572 A * | | 1/1969 | Bisland | B60N 2/829 180/271 |
| 3,623,768 A * | | 11/1971 | Capener | B60N 2/757 297/330 |
| 3,650,223 A * | | 3/1972 | Kobori | A47C 7/70 108/44 |
| 3,901,550 A * | | 8/1975 | Hamy | B60R 21/02 297/486 |
| 3,981,520 A * | | 9/1976 | Pulling | B60N 2/4221 280/730.2 |
| 3,985,374 A * | | 10/1976 | Powaska | B60N 3/004 280/730.1 |
| 4,413,838 A * | | 11/1983 | Varterasian | B60R 21/02 280/751 |
| 4,565,535 A * | | 1/1986 | Tassy | B60R 21/16 244/121 |
| 4,765,569 A * | | 8/1988 | Higgins | B60R 21/16 244/118.5 |
| 4,906,047 A * | | 3/1990 | Mikami | B60N 2/4221 297/464 |
| 5,324,071 A * | | 6/1994 | Gotomyo | B60N 2/02 280/730.1 |
| 5,375,908 A * | | 12/1994 | Goor | B60R 21/01 297/216.11 |
| 5,390,952 A * | | 2/1995 | Goor | B60R 21/01 280/730.1 |
| 5,468,013 A * | | 11/1995 | Gille | B60R 21/20 280/729 |
| 5,492,361 A * | | 2/1996 | Kim | B60R 21/02 280/730.1 |
| 5,505,487 A * | | 4/1996 | Brown | B60R 21/207 280/730.1 |
| 5,511,850 A * | | 4/1996 | Coursey | B60N 2/2839 297/216.11 |
| 5,524,960 A * | | 6/1996 | Townsend | B60N 2/79 296/155 |
| 5,528,783 A * | | 6/1996 | Kunz | A47C 20/048 5/615 |
| 5,564,736 A * | | 10/1996 | Kim | B60R 21/02 280/730.2 |
| 5,645,319 A * | | 7/1997 | Parks, Jr. | A47C 16/00 297/391 |
| 5,655,817 A * | | 8/1997 | Nienow | B60N 2/2839 297/216.11 |
| 5,716,026 A * | | 2/1998 | Pascasio | B64D 11/00 105/315 |
| 5,730,458 A * | | 3/1998 | Byon | B60R 19/00 280/730.2 |
| 5,738,368 A * | | 4/1998 | Hammond | B60N 2/68 280/730.1 |
| 5,746,443 A * | | 5/1998 | Townsend | B60R 21/20 280/730.2 |
| 5,851,055 A * | | 12/1998 | Lewis | B60R 21/18 297/483 |
| 5,938,237 A * | | 8/1999 | Abels | B60J 5/0487 280/753 |
| 5,984,347 A * | | 11/1999 | Blanc-Rosset | B60N 3/004 280/727 |
| 6,030,036 A * | | 2/2000 | Fohl | B60R 21/207 297/216.14 |
| 6,234,525 B1 * | | 5/2001 | Schroder | B60R 21/02 280/748 |
| 6,315,245 B1 * | | 11/2001 | Ruff | B64D 25/02 244/122 AG |
| 6,557,887 B2 * | | 5/2003 | Wohllebe | B60R 21/207 280/730.1 |
| 6,805,403 B2 * | | 10/2004 | Buch | B60N 3/00 297/146 |
| 6,874,810 B2 * | | 4/2005 | Soderquist | B60R 21/201 280/728.3 |
| 6,959,944 B2 * | | 11/2005 | Mori | B60R 21/203 280/728.2 |
| 7,641,233 B2 * | | 1/2010 | Korechika | B60R 21/18 280/753 |
| 7,726,733 B2 * | | 6/2010 | Balser | B60N 2/4279 297/216.1 |
| 8,430,192 B2 * | | 4/2013 | Gillett | B60K 7/0007 180/65.51 |
| 8,474,917 B2 * | | 7/2013 | Line | B60N 2/6009 297/452.38 |
| 8,820,830 B2 * | | 9/2014 | Lich | B60N 2/986 297/216.13 |
| 8,870,219 B1 * | | 10/2014 | Roy | B60R 21/205 280/728.3 |
| 8,967,659 B2 * | | 3/2015 | O'Gara | B29C 59/007 280/728.3 |
| 8,985,622 B1 * | | 3/2015 | Cannon | B60R 21/207 280/730.2 |
| 9,010,799 B2 * | | 4/2015 | Hagl | B60R 21/205 280/728.3 |
| 9,272,680 B1 * | | 3/2016 | Mirzazadeh | B64D 11/0619 |
| 9,352,839 B2 * | | 5/2016 | Gehret | B64D 11/06205 |
| 9,428,132 B2 * | | 8/2016 | Obadia | B64D 11/00 |
| 9,511,866 B2 * | | 12/2016 | Gehret | B64D 11/0604 |
| 9,623,826 B2 * | | 4/2017 | Weng | B60R 21/215 |
| 9,783,155 B2 * | | 10/2017 | Kondo | B60R 22/48 |
| 9,930,977 B1 * | | 4/2018 | Jennings | B64D 11/06205 |
| 9,994,178 B2 * | | 6/2018 | Paxton | B60R 21/203 |
| 10,035,484 B2 * | | 7/2018 | Jaradi | B60R 21/2338 |
| 10,081,323 B2 * | | 9/2018 | Nagasawa | B60R 21/231 |
| 10,232,815 B1 * | | 3/2019 | Dry | B60R 21/207 |
| 10,266,141 B2 * | | 4/2019 | Nagatsu | B60R 21/207 |
| 10,272,865 B2 * | | 4/2019 | Nagasawa | B60N 2/753 |
| 10,343,644 B2 * | | 7/2019 | Dry | B60R 21/2334 |
| 10,449,882 B2 * | | 10/2019 | Lev | B61D 33/005 |
| 10,479,306 B2 * | | 11/2019 | Kondrad | B60R 21/2072 |
| 10,479,310 B2 * | | 11/2019 | Dry | B60R 21/207 |
| 10,513,206 B2 * | | 12/2019 | Spahn | B60N 2/4207 |
| 10,583,797 B2 * | | 3/2020 | Line | B60N 2/42763 |
| 10,604,259 B2 * | | 3/2020 | Browning | B60R 22/26 |
| 10,766,447 B2 * | | 9/2020 | Jung | B60R 21/207 |
| 2003/0030253 A1 * | | 2/2003 | Galmiche | B60R 21/205 280/728.2 |
| 2003/0193220 A1 * | | 10/2003 | Jensen | B60N 3/004 297/146 |
| 2005/0283288 A1 * | | 12/2005 | Howell | B62D 1/18 701/41 |
| 2013/0009430 A1 * | | 1/2013 | Islam | B64D 11/0619 297/216.1 |
| 2013/0026803 A1 * | | 1/2013 | Islam | B64D 11/06205 297/216.13 |
| 2013/0075524 A1 * | | 3/2013 | Islam | B64D 25/00 244/118.5 |
| 2013/0093221 A1 * | | 4/2013 | Ligonniere | B64D 11/06 297/173 |
| 2013/0341975 A1 * | | 12/2013 | Schneider | B64D 11/0638 297/163 |
| 2015/0232184 A1 * | | 8/2015 | Gehret | B60R 21/26 244/121 |
| 2016/0052477 A1 * | | 2/2016 | Tobata | B60N 2/002 280/730.1 |

(56) References Cited

U.S. PATENT DOCUMENTS

| | | | | |
|---|---|---|---|---|
| 2018/0281724 A1* | 10/2018 | Nagasawa | ............... | B60R 21/18 |
| 2018/0281725 A1* | 10/2018 | Nagasawa | ................ | B60N 2/79 |
| 2019/0061665 A1* | 2/2019 | Kondrad | ............... | B60N 2/427 |
| 2019/0092264 A1* | 3/2019 | Spahn | ................... | B60N 2/14 |
| 2019/0106077 A1* | 4/2019 | Dry | ....................... | B60R 21/215 |
| 2019/0111877 A1* | 4/2019 | Line | ..................... | B60R 21/233 |
| 2019/0118754 A1* | 4/2019 | Dry | ......................... | B60N 2/14 |

FOREIGN PATENT DOCUMENTS

| | | | | |
|---|---|---|---|---|
| JP | 11-180398 | * | 7/1999 | ............ B64D 25/00 |
| JP | H11180398 A | | 7/1999 | |

* cited by examiner

TRAY TABLE AIRBAG ASSEMBLY

TECHNICAL FIELD

This disclosure relates to a tray table having an associated airbag.

BACKGROUND

Inflatable airbags are common in the automotive industry. Airbags are typically integrated into the steering wheel hub and the dashboard.

SUMMARY

According to one embodiment, a system for increasing passenger safety within an airplane (10) is provided. The system includes a forward seat (16) having a back surface of bulkhead that faces an occupant in a seat (14). A tray table holder (22) is secured to or integrated with the back of the forward seat (16). A tray table (20) is rotatably connected to the tray table holder (22) via a hinge (40) and is rotatable between a horizontal orientation and a vertical orientation. The tray table has an upper surface (27) that faces upward when the tray table (20) is in the horizontal orientation and an opposed lower surface (31). The tray table and tray table holder define a cavity (32) between the upper and lower surfaces (27, 31) and sides 29 of the tray table holder. An airbag is disposed within the cavity (32). A fluidly sealed coupling (42) is coupled to the airbag (54) and is rotatable about the hinge (40) such that the fluidly sealed coupling (42) rotates as the tray table (20) rotates between the vertical orientation and horizontal orientation. An inflator (52) is connected typically via a tube 53 to the inflator fluidly sealed coupling (42) and is configured to deliver gas therefrom to the airbag (54) via the inflator fluidly sealed coupling (42).

The hinge (40) may include a cylindrical hinge pin (48), and the tray table (20) and the inflator fluidly sealed coupling (42) may include respective hinge members (46, 44) rotatably coupled to the hinge pin (48).

The inflator (52) may be secured to the airplane within the forward seat (16).

The cavity (32) may be defined between an interior surface of the tray table (20), and the interior surface may define a line of weakness (36) to facilitate tearing to allow the airbag (54) to project from the tray table (20) toward the passenger upon inflation.

According to another embodiment, a tray table airbag assembly includes a tray table, an airbag, and an inlet device. The tray table is rotatable about a hinge (40) between a vertical orientation and a horizontal orientation. The tray table includes an upper surface (27) that faces upward when the tray table (20) is in the horizontal orientation and an opposed lower surface (31). The tray table (20) also defines an airbag housing (32) between the upper surface (27) and the lower surface (31). The airbag (54) is disposed within the airbag housing. The inlet device (42) is coupled to the airbag (54) and is configured to deliver gas to the airbag (54) to inflate the airbag. The inlet device (42) is rotatable about the hinge (40) such that the inlet device (42) rotates as the tray table (20) rotates between the vertical orientation and horizontal orientation.

The assembly may include an inflator (52) coupled to the inlet device (42), wherein the inflator contains gas and is configured to deliver the gas to the airbag (54) via the inlet device (42). The assembly may also include a flexible hose (53) connecting the inflator (52) to the inlet device (42) to accommodate rotation of the inlet device (42). The inflator (52) may be mounted to the tray table (20) between the lower surface (31) of the tray table (20) and the airbag housing (32). The tray table (20) may be rotatably coupled to a seat (16), and the inflator (52) may be mounted within the seat (16).

The hinge (40) may include a cylindrical hinge pin (48), and the tray table (20) and the inlet device (42) may include respective hinge members (46, 44) rotatably coupled to the hinge pin (48).

The airbag housing (32) may be defined between a first inner surface facing the lower surface of the tray table, and an opposed second inner surface facing the upper surface of the tray table. The second inner surface may include a tear seam (36) integrated therein to facilitate an exit of the airbag (54) from the airbag housing (32) when the airbag (54) is inflated. The tear seam (36) may include three tear seam lines in a general shape of an "H."

According to yet another embodiment, a tray table airbag assembly includes a tray table (20) configured to rotatably mount to a back of a seating unit (16) between a vertical orientation to a horizontal orientation. The tray table (20) includes an upper member (26) that faces upward when the tray table (20) is in the horizontal orientation, and an opposing lower member (30). The tray table (20) defines a cavity (32) between the upper and lower members (26, 30), and a line of weakness (36). An airbag (54) is within the cavity (32). An inflator (52) is fluidly coupled to the airbag (54) to enable gas contained in the inflator (52) to be delivered to the airbag (54). Activation of the inflator (52) causes the airbag (54) to inflate and break through the line of weakness (36).

The lower member (30) may include an inner surface facing the cavity and an opposed outer surface, and the inner surface may define the line of weakness (36).

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
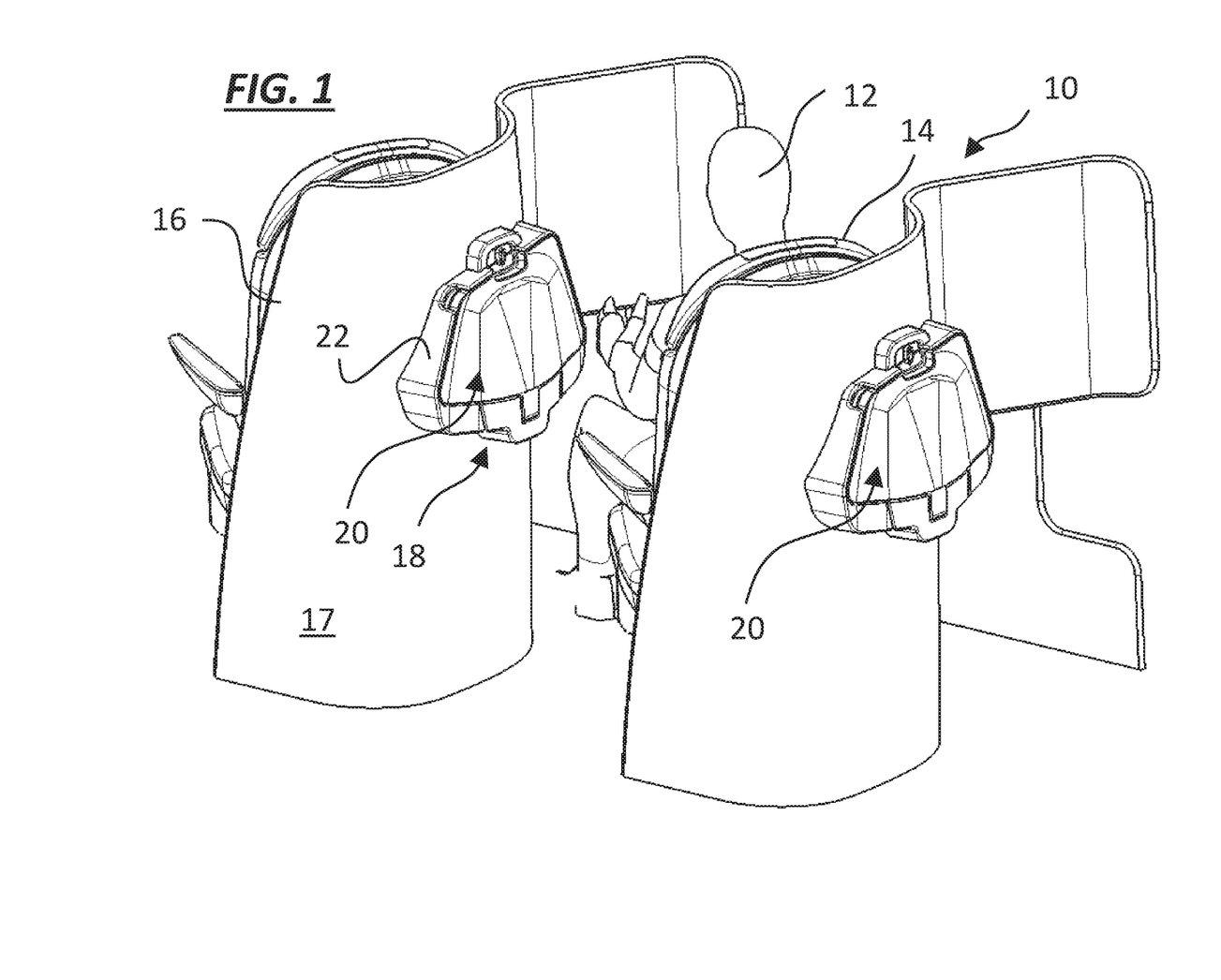
FIG. 1 is a perspective view of a portion of an interior of a passenger airplane, according to one embodiment.

FIG. 1 illustrates an interior of a passenger airplane 10. The interior shown in FIG. 1 is a first-class or business-class section of the airplane 10, but the present disclosure is not limited to such applications. A passenger 12 or occupant is seated within a rearward or back seat 14 that is rearward of a front or forward seat 16. The forward seat 16 has a back surface 17 that faces the occupant seat 14. At the back of the forward seat 16 is a tray table airbag assembly 18 according to various embodiments described in detail below. The tray table airbag assembly 18 includes a tray table subassembly 20 that is shown in a generally vertical, upright, or stowed position in FIG. 1. When in the upright position, the tray table 20 can be selectively fastened to a tray table holder 22 via a clip. The tray table holder 22 can be secured to or integrated with the rear of the seat 16.

Figure 2:
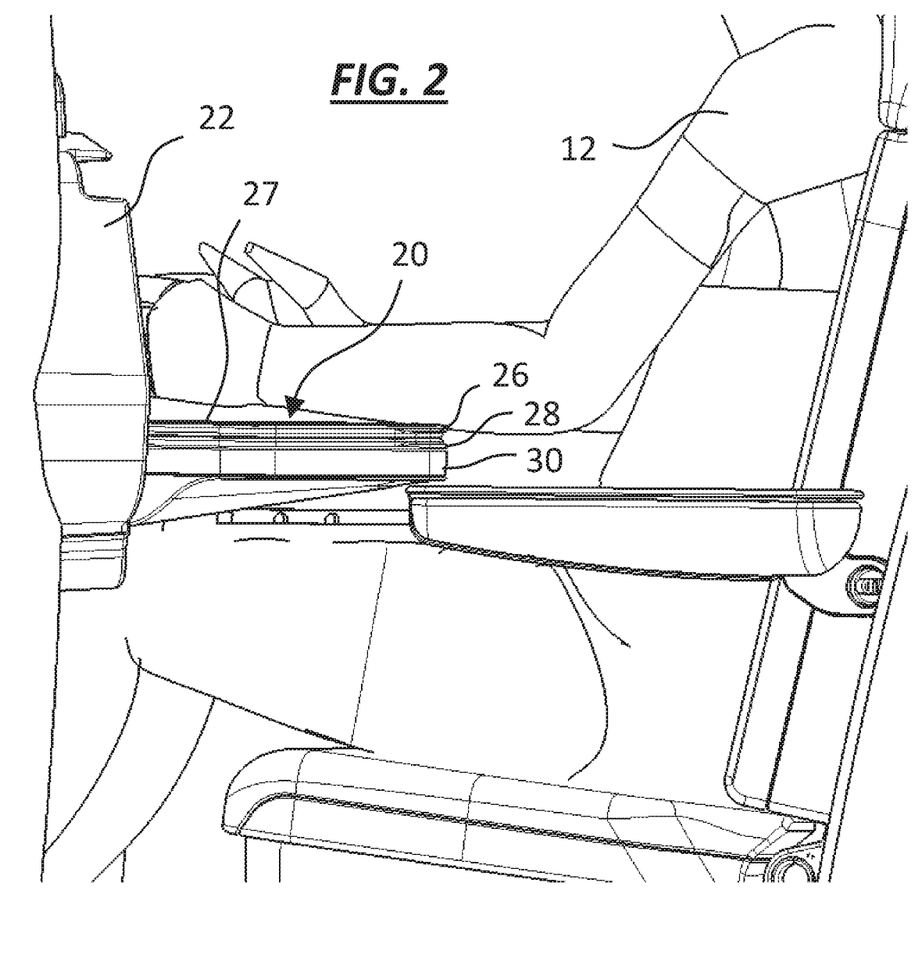
FIG. 2 is a side perspective view of a seat within the airplane with a tray table folded down, according to one embodiment.
Figure 3:
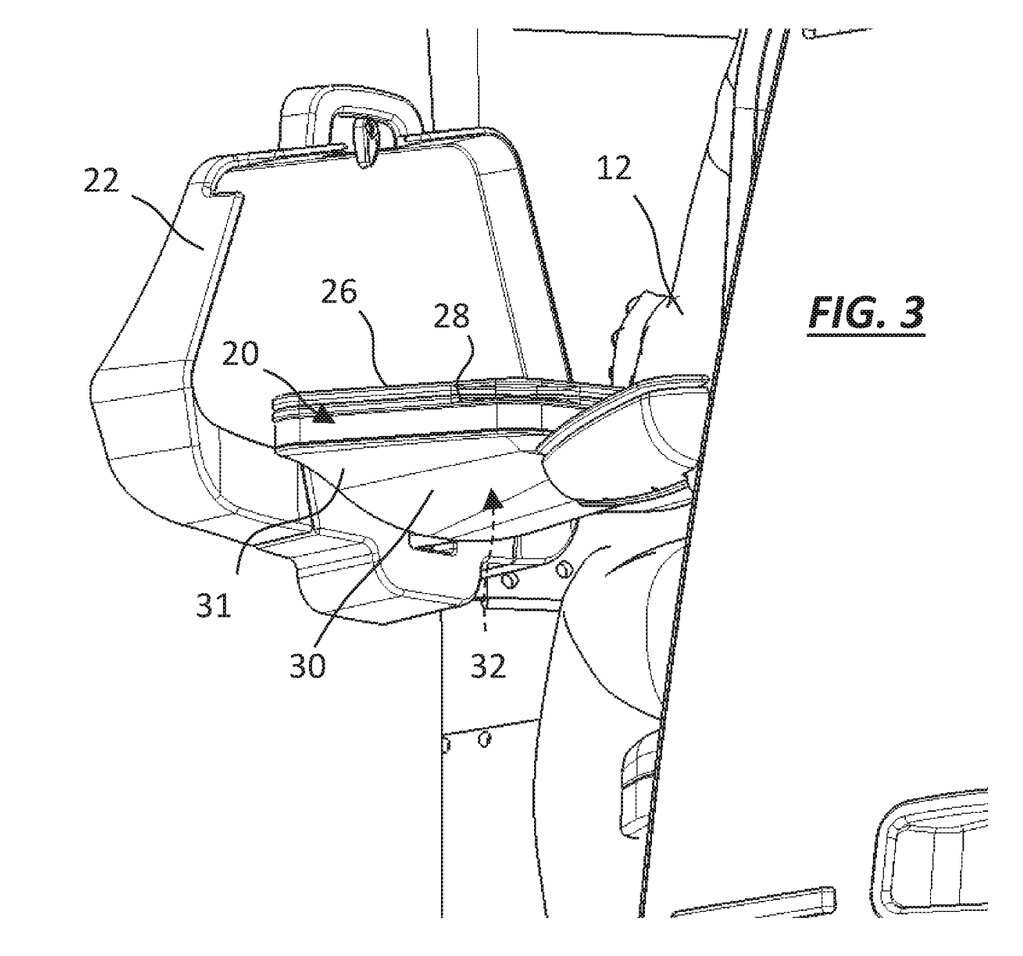
FIG. 3 is a perspective view of the tray table folded down and generally horizontal with respect to a tray table holder, according to one embodiment.

FIGS. 2 and 3 show different views of the tray table assembly 20 folded down and away from the tray table holder 22 in a horizontal or folded-down position. FIGS. 4-11 also show various parts of the tray table in conjunction with an airbag inflator and other structure.

Figure 7:
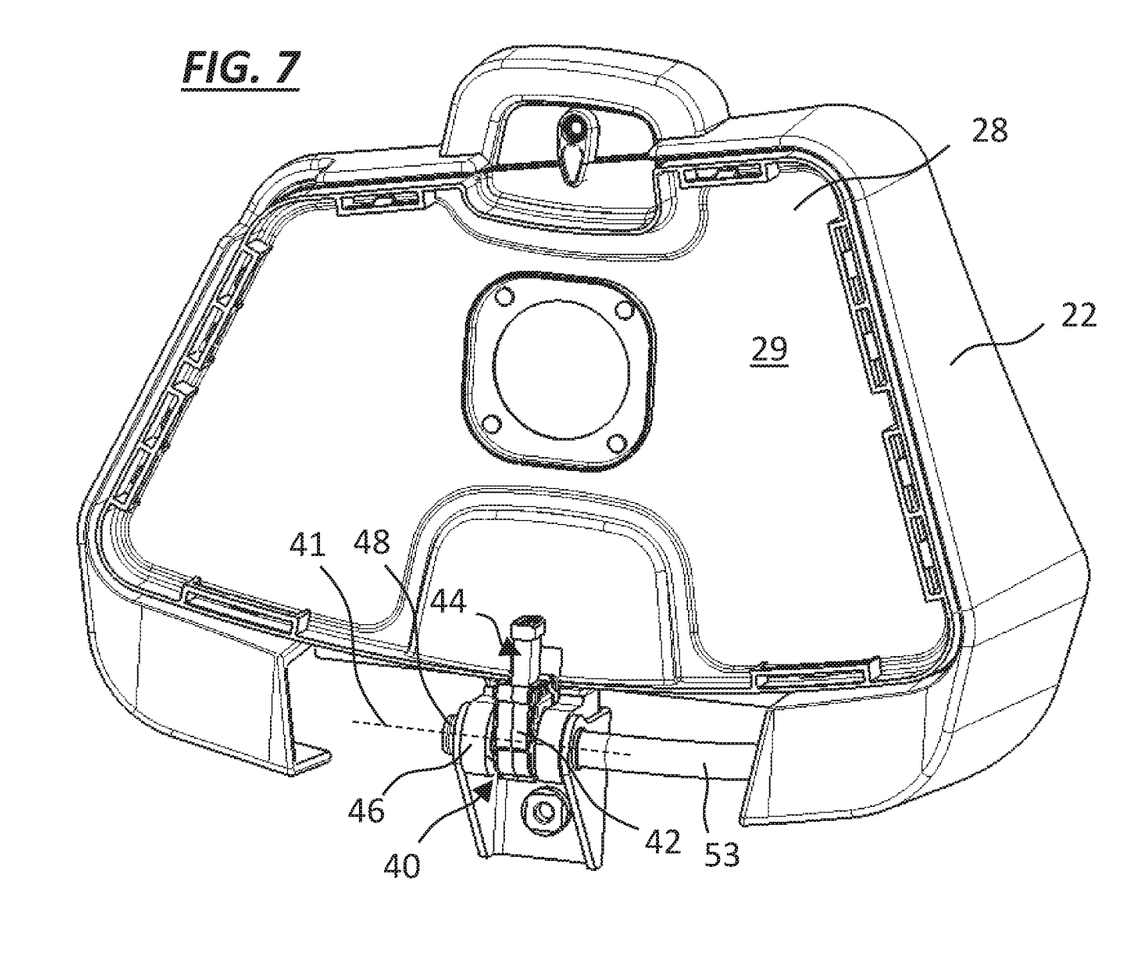
FIG. 7 is a perspective view of the tray table holder and part of the inner cavity in which an airbag resides, coupled to the inflator via a rotatable inflator inlet, according to one embodiment.
Figure 8:
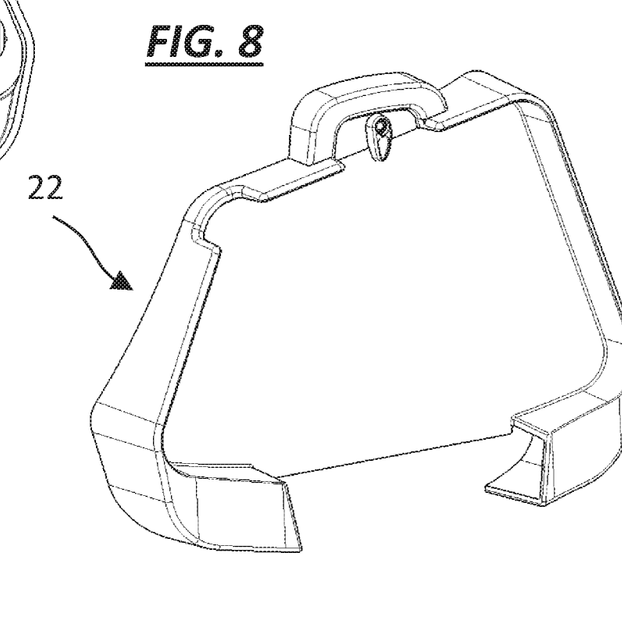
FIG. 8 is a perspective isolation view of the tray table holder, according to one embodiment.
Figure 9:
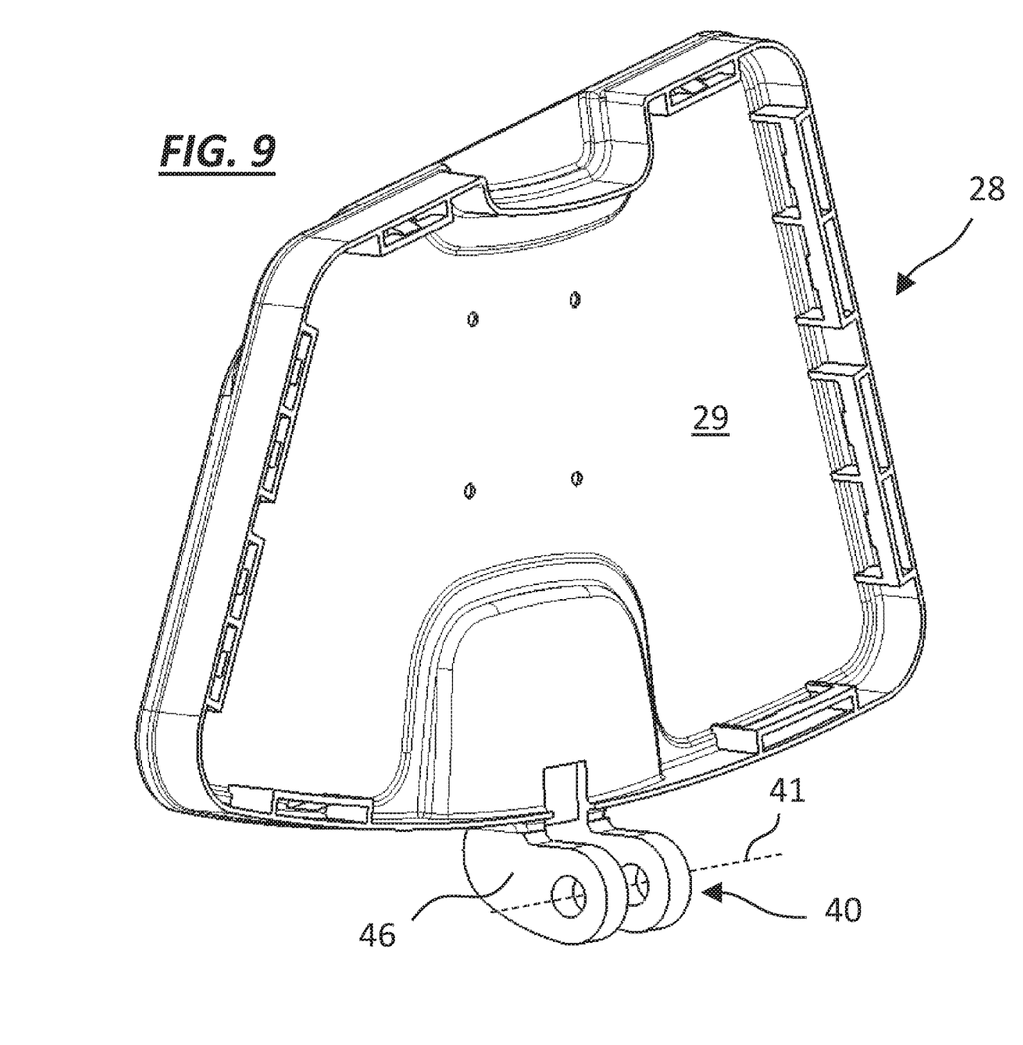
FIG. 9 is a perspective isolation view of an airbag housing within the tray table, according to one embodiment.

The tray table subassembly 20 includes an upper tray member 26 that defines an upper surface 27 of the tray table 20. The tray table 20 also includes a lower tray member 28 that is either secured to the upper tray member 26 or formed as a single integral part with the upper tray member 26. The lower tray member 28 defines an inner surface 29, as best seen in FIGS. 7 and 9. A cushion pack holder 30 is attached to (or formed integrally with) the lower tray member 28 and defines a lower surface 21 of the tray table 20.

The tray table assembly 20 defines a cavity 32 therein. More specifically, according to one embodiment, the cushion pack holder 30 and the lower tray member 28 cooperate to define the cavity 32 within the tray table 20. For example, the lower tray member 28 and the cushion pack holder 30 can collectively define an interior surface 34 that surrounds the cavity 32 on one side. The cavity is also defined by the inside surface of the tray table holder 22. In other embodiments, the cavity 32 exists elsewhere between the upper surface 27 and the lower surface 31 of the tray table. An airbag 54 is disposed within this cavity 32. As will be described below, the airbag is controlled to inflate and exit the tray table 20 to improve the safety of the airplane and mitigate injuries to passengers 12 within the airplane in the event of a runway collision, for example.

A hinge 40 is also illustrated in the figures. The hinge 40 allows the tray table 20 to rotate or pivot between its vertical, upright position and its horizontal, downward position. Various working parts of the hinge 40 are rotatable about a hinge axis 41 that extends along a length of the hinge. The hinge 40 includes a swivel coupling member 42 configured to swivel or rotate about the hinge axis 41. As will be described further below, the coupling member 42 is a rotatable hinge member that fluidly couples an airbag inflator with a corresponding airbag within the tray table.

An outlet 44 extends from or is directly connected to the coupling member 42. The inlet 44 fluidly couples the coupling member 42 to the airbag within the tray table 20. The airbag is in the cavity of the tray table 20. The inlet 44 is configured to be fitted within an opening of the airbag to allow air to flow through the inlet 44 and into the airbag. The inlet 44 is therefore tubular and hollow, but its structural shape is not intended to be limited to the design shown in the Figures.

The coupling member 42 and the inflator inlet 44 are therefore rotatable about the hinge axis 41. Because an airbag can be disposed within the tray table 20, the swiveling nature of the coupling member 42 and the inflator 44 allows the inlet to the airbag to rotate as the tray table rotates between its horizontal and vertical positions. In other words, the inlet to the airbag can rotate as the tray table and the airbag contained therein rotate.

As best seen in FIGS. 7 and 9, the hinge 40 also includes a coupling member 46 that couples to the tray table 20. In the embodiment shown in FIG. 9, the coupling member 46 extends from the lower tray member 28 of the tray table. The coupling member 46 can include two legs spaced apart such that the coupling member 42 of the inflator inlet fits between the legs.

Two different coupling members are therefore provided at the hinge 40. One coupling member 42 is a swivel coupling member for the inlet to the airbag. The other coupling member 46 extends from the tray table to allow the tray table to swivel about the hinge axis 41. Both coupling members 42, 46 can include apertures to allow a cylindrical hinge pin 48 to pass therethrough. In one embodiment, the hinge pin 48 is part of or extends from a hose 53 of the inflator 52 that is described below, such that the coupling members 42, 46 engage and rotate about the hose. The pin 48 can be hollow to allow gas from the inflator to pass therethrough and into the inlet 44 to the airbag.

An inflator 52 is illustrated in several of the figures. The inflator 52 is a canister that is configured to contain a gaseous substance used for inflating the airbag within the tray table 20. A hose 53 connects the inflator 52 to the airbag. In one embodiment, the inflator includes a gas, such as air, argon, helium, or any combination thereof. The inflator 52 may have one or more pyrotechnic elements including an initiator that is capable of initiating the release of the stored gas or heating the stored gas prior to entering the hose 53 and the airbag. The initiator receives a signal from an associated controller (not shown) when conditions dictate that the airbag should be inflated.

Figure 4:
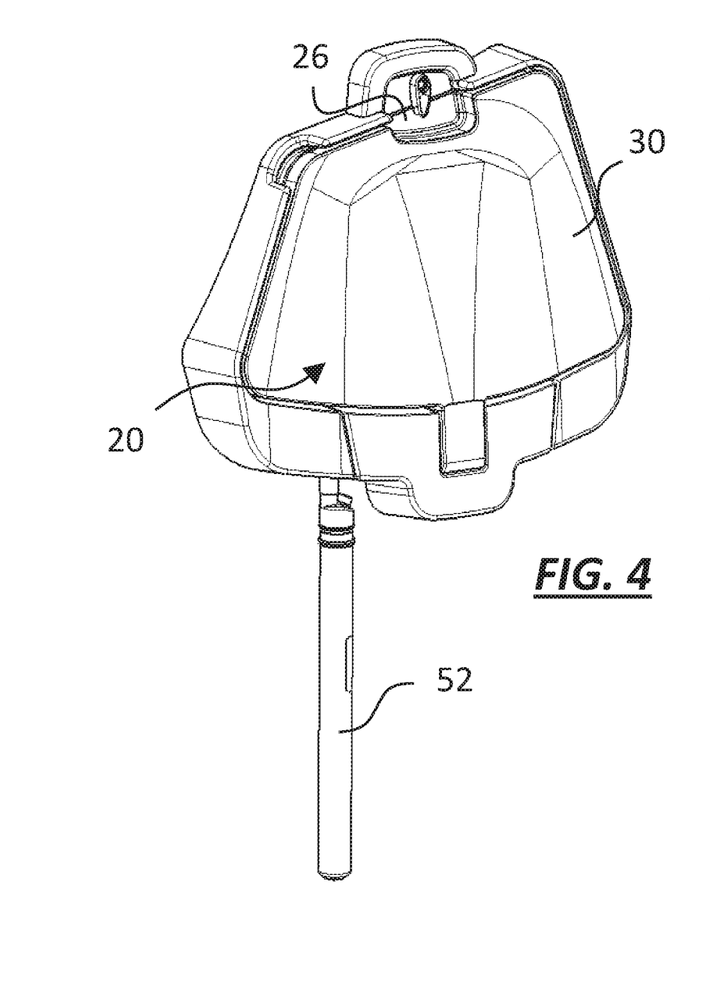
FIG. 4 is a perspective view of the tray table folded up in an upright orientation in its tray table holder and coupled to an inflator for inflating an airbag within the tray table, according to one embodiment.
Figure 5:
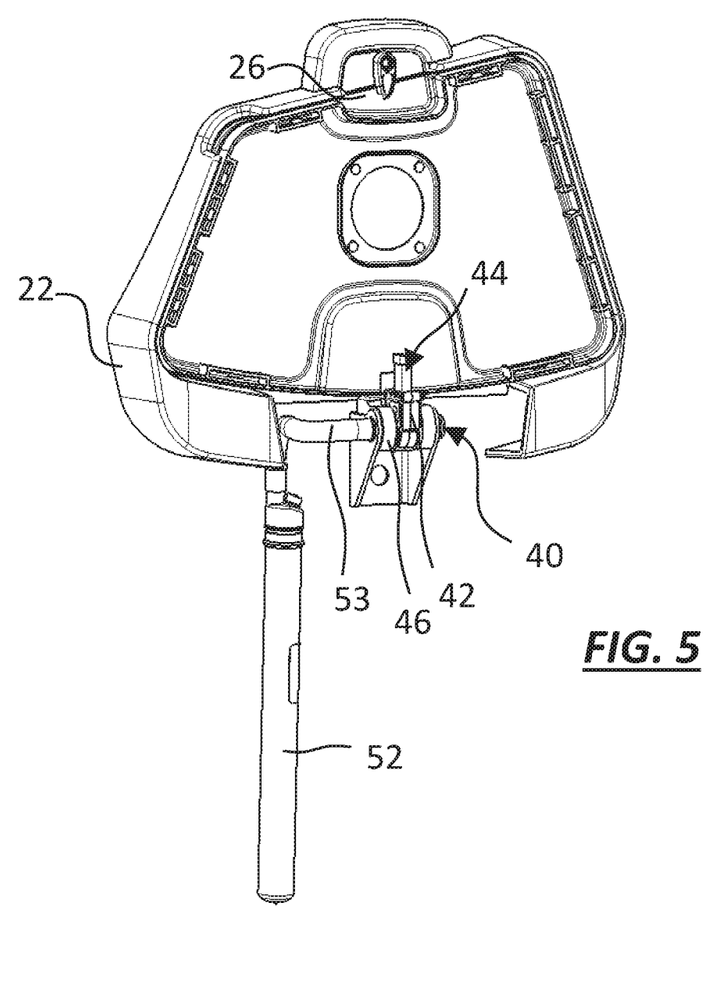
FIG. 5 is a perspective view showing an interior of the tray table and its connection to the inflator, according to one embodiment.
Figure 6:
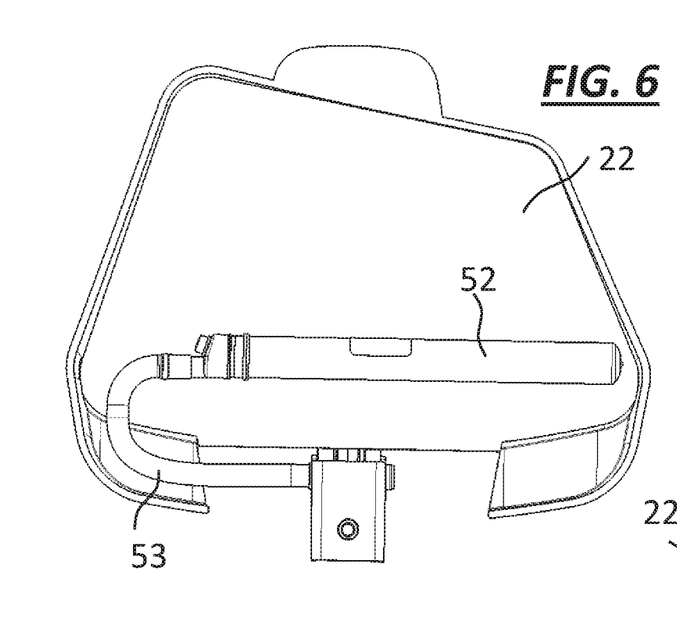
FIG. 6 is a plan view of the tray table holder having the inflator disposed therein, according to one embodiment.

Various locations for the inflator 52 are contemplated. For example, FIGS. 4-5 illustrate an embodiment in which the inflator extends downwards from the tray table, towards the floor of the airplane in a vertical orientation. This configuration allows the inflator 52 to be concealed within the forward seat 16, forward of the back 17 of the forward seat. FIGS. 6-7 illustrate another embodiment in which the inflator 52 is stored within the tray table holder 22. In another embodiment, the inflator 52 is secured beneath the floor of the airplane. In yet another embodiment, the inflator 52 is secured within the tray table itself, above the cushion pack holder 30 when the tray table is in its horizontal orientation. Other embodiments are contemplated in which one large inflator 52 is used for a number of seats in the same row or in multiple rows, such that gas from one single inflator is delivered to multiple airbags.

The hose 53 is flexible relative to the inflator 52 to allow the hose to bend and contort while the inflator 52 is properly aligned and attached in its desired position. In other embodiments, the hose 53 includes a plurality of rigid sections that are rotatably coupled to one another. In all embodiments, the hose 53 is made of a material that will allow the safe travel of pressurized gas therethrough from the inflator 52 to the airbag without rupture or significant leakage.

Figure 10:
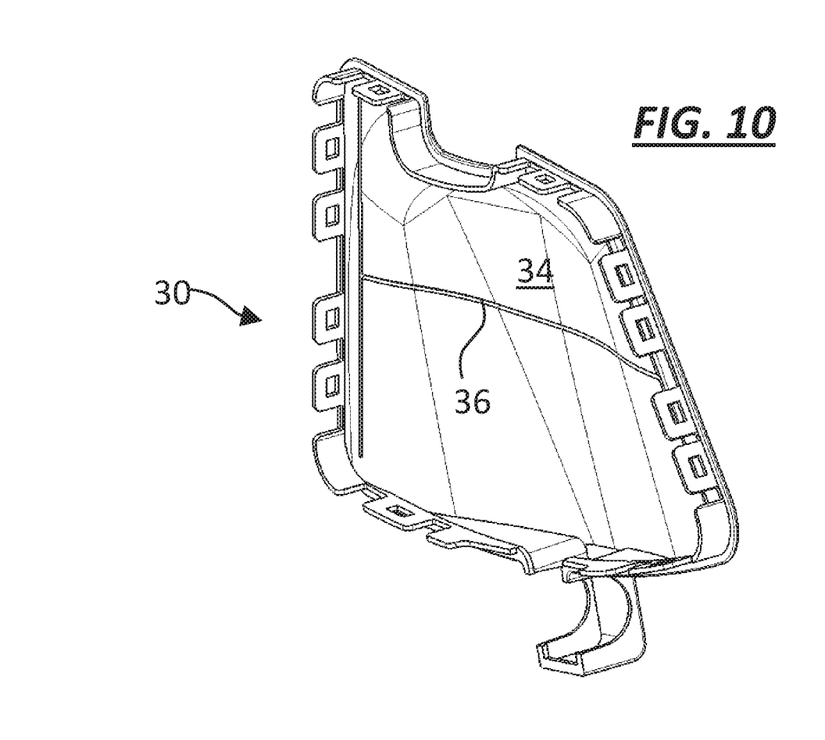
FIG. 10 is a perspective isolation view of an airbag cover within the tray table, according to one embodiment.
Figure 11:
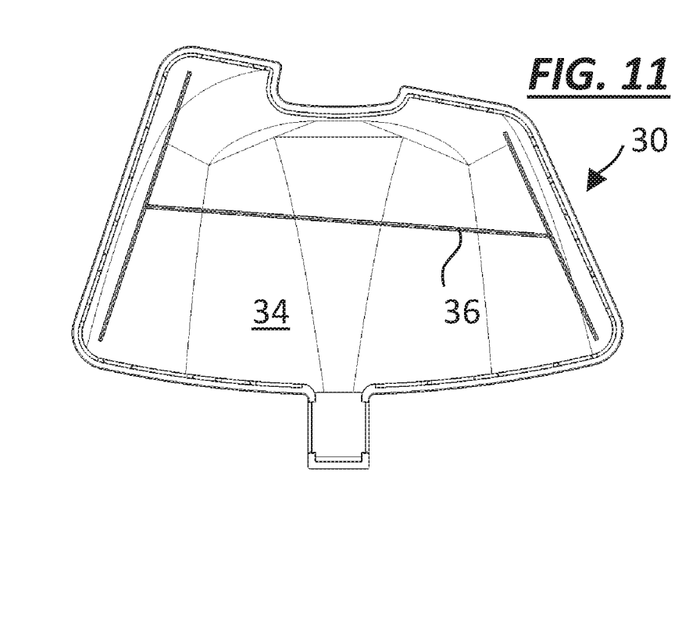
FIG. 11 is a front plan view of the airbag cover of FIG. 10 illustrating tear seams, according to one embodiment.

Referring to FIGS. 10-11, the inner shell or surface within the tray table can include a weakened point, weakened line, weakened region, or a tear seams 36. In one embodiment, a weakened line of material is provided. The weakened line can include tear seams 36 that collectively form the shape of an "H," as best seen in FIG. 11. The weakened line of material is ruptured as the airbag inflates, thereby providing a channel or guide for the inflating airbag. In operation, once associated sensors within the airplane sense an actual or impending collision, an activation signal is sent to the igniter of the inflator 52, which provides the supply or the generation of gas, which is communicated to the airbag through the hose 53 and the inflator inlet 44. The airbag is then inflated, rupturing the inner surface 34 of the cushion pack holder 30 of the tray table 20 that covers the airbag.

By referring to the tear seams 36 as being H-shaped, this disclosure is not limited to two parallel lines with one central line extending from both parallel lines at 90 degrees. Instead, a general H-shape is not necessarily a perfect "H," but is what an ordinary observer would identify as being generally H-shaped.

Figure 12A:
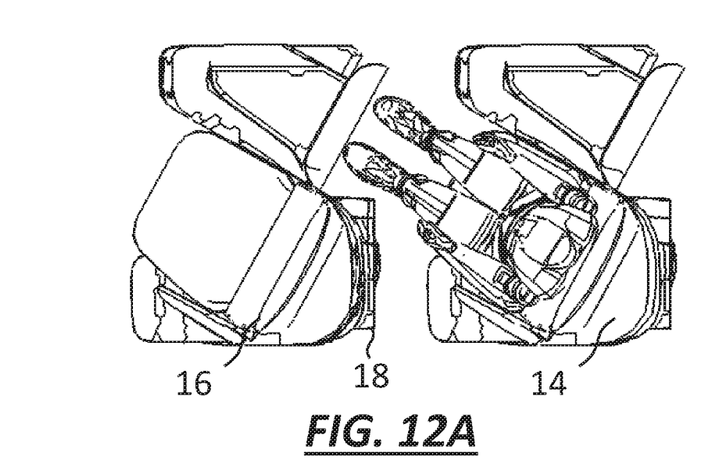
FIGS. 12A and 12B are top and side perspective views, respectively, of the tray table and airbag assembly prior to the airbag inflating, according to one embodiment.
Figure 12B:
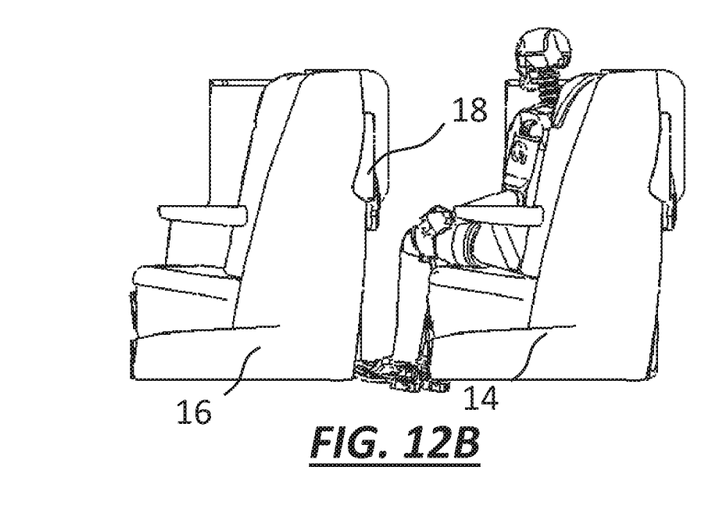
Figure 13A:
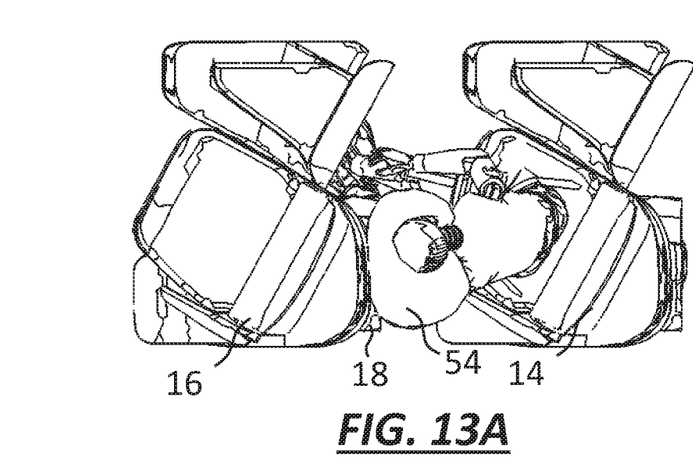
FIGS. 13A and 13B are top and side perspective views, respectively, of the tray table and airbag assembly after the airbags have been inflated to improve the safety of passengers within the airplane, according to one embodiment.
Figure 13B:
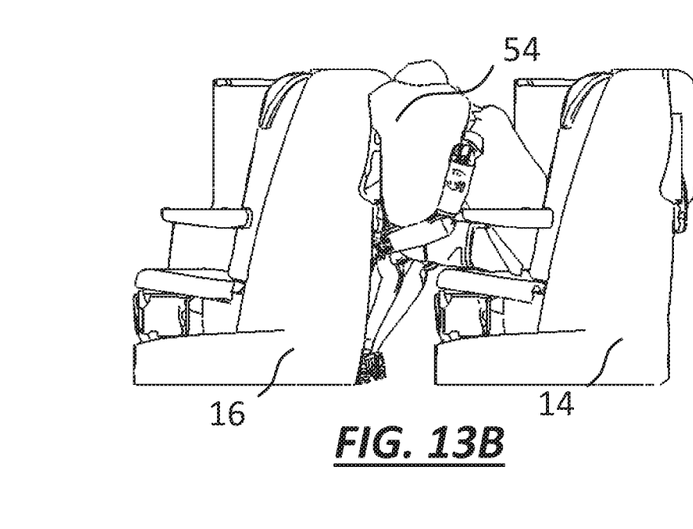

FIGS. 12A and 12B show the tray table airbag assembly 18 prior to the airbag 54 being inflated, and FIGS. 13A and 13B show the tray table airbag assembly 18 once the airbag 54 has been inflated. Reference will now be made to these figures, along with the structure of the airbag assembly described above. Prior to inflation of the airbag 54 via the inflator 52, the tray table 20 is in its upright, vertical position and is latched into place within the tray table holder 22. The cushion pack holder 30 and the lower surface 31 of the tray table 20 faces the passenger 12. Then, upon receiving a signal indicating an impact event or an upcoming impact event, the controller commands the inflator 52 to pressurize and inflate the airbag 54. The airbag 54 breaks through the lines of weakness 36 on the inner surface of the cushion pack holder 30. The inflated airbag 54 provides a safe landing region for the passenger's head and upper body should the momentum of the impact event carry the passenger forward.

In one embodiment, a sensor (not shown) may be provided to assure that the tray table 20 is in its vertical orientation and/or secured to the tray table holder 22. Such sensors may include a contact sensor, a light sensor, a physical location sensor, or other forms of sensors capable of and configured to determine that the tray table 20 is in its vertical orientation and/or secured to the tray table holder.

The controller (not shown) that communicates with the inflator 52 may be programmed to command the inflator 52 to inflate the airbag 54 only if the tray table is in its vertical orientation and/or secured to the tray table holder. This assures that any deployment of the airbag will be in the direction toward the passenger sitting in the occupant seat 14.

The system described above increases passenger safety within an airplane during moments of possible impacts, such as during takeoff, landing, or taxiing along the airport runway or between terminals. However, this disclosure is not limited to such settings. For example, passenger trains and busses and locomotives may also include this system.

References herein to terms such as "vertical", "horizontal", etc. are made by way of example, and not by way of limitation, to establish a frame of reference. For example, the term "horizontal" as used herein is intended to mean a plane parallel to the underlying surface of the earth that supports a vehicle, such as an airplane. The term "vertical" refers to a direction perpendicular to the horizontal plane. When these terms are used to describe the orientation of the tray table, the terms are not intended to be exactly and precisely horizontal and vertical; rather, the terms are intended to describe what an ordinary observer and one of skill in the art would deem as generally "horizontal" and generally "vertical" when the two orientations are compared to one another. Terms, such as "above," "below," etc. are intended to describe locations with respect to the horizontal plane. It is understood various other frames of reference may be employed without departing from the spirit and scope of the invention.

It is contemplated that some airliners have some seats that face toward the front, and some other seats that face toward the rear. In these embodiments, it is contemplated that the terms "front," "back," "forward" and "rear" can be reversed for the seats that face the rear of the plane. Again, these terms in the detailed description and in the claims are not intended to be limited, but rather for exemplary description purposes only to give context to the structure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for increasing passenger safety within an airplane, the system comprising:

a forward seat having a back that faces an occupant seat;
a tray table holder separately formed from, and secured to, the back of the forward seat;
a tray table rotatably connected to the tray table holder via a hinge and rotatable between a horizontal orientation and a vertical orientation, the tray table having an upper surface that faces upward when the tray table is in the horizontal orientation and an opposed lower surface, wherein the tray table defines a cavity between the upper and lower surfaces and a line of weakness;
an airbag within the cavity;
an inflator fluidly sealed coupling coupled to the airbag and rotatable about the hinge such that the inflator fluidly sealed coupling rotates as the tray table rotates between the vertical orientation and horizontal orientation; and
an inflator connected to the inflator fluidly sealed coupling and configured to deliver gas therefrom to the airbag via the inflator fluidly sealed coupling,
wherein the lower surface includes an inner surface facing the cavity and an opposed outer surface, the inner surface defining the line of weakness,
wherein the hinge includes a cylindrical hinge pin, and wherein the tray table and the inflator fluidly sealed coupling include respective hinge members rotatably coupled to the hinge pin.

2. The system of claim 1, wherein the inflator is secured to the airplane within the forward seat.

3. A tray table airbag assembly comprising:
a tray table rotatable about a hinge between a vertical orientation and a horizontal orientation, the tray table including an upper surface that faces upward when the tray table is in the horizontal orientation and an opposed lower surface, the tray table defining an airbag housing between the upper surface and the lower surface and a line of weakness;
a tray table holder securable to a separately formed surface and configured to receive the tray table, wherein the tray table is hingedly connected to the tray table holder via the hinge;
an airbag within the airbag housing; and
an inlet device coupled to the airbag and configured to deliver gas to inflate the airbag, wherein the inlet device is rotatable about the hinge such that the inlet device rotates as the tray table rotates between the vertical orientation and horizontal orientation,
wherein the lower surface includes an inner surface facing the airbag housing and an opposed outer surface, the inner surface defining the line of weakness,
wherein the hinge includes a cylindrical hinge pin, wherein the tray table and the inlet device include respective hinge members rotatably coupled to the hinge pin.

4. The assembly of claim 3, further comprising an inflator coupled to the inlet device, the inflator containing gas and configured to deliver the gas to the airbag via the inlet device.

5. The assembly of claim 4, further comprising a flexible hose connecting the inflator to the inlet device to accommodate rotation of the inlet device.

6. The assembly of claim 4, wherein the inflator is mounted to the tray table between the lower surface of the tray table and the airbag housing.

7. The assembly of claim 4, wherein the tray table is rotatably coupled to a seat, and wherein the inflator is mounted within the seat.

8. The assembly of claim 3, wherein the line of weakness is a plurality of intersecting lines of weaknesses in a general shape of an "H".

9. A tray table airbag assembly comprising:
a tray table configured to rotatably mount to a surface between a vertical orientation to a horizontal orientation, the tray table including an upper member that faces upward when the tray table is in the horizontal orientation, and an opposing lower member, the tray table defining a cavity between the upper and lower members and a line of weakness;
a tray table holder separately formed from, and secured to, the surface and configured to receive the tray table, wherein the tray table is hingedly connected to the tray table holder via a hinge;
an airbag within the cavity; and
an inflator fluidly coupled to the airbag to enable gas contained in the inflator to be delivered to the airbag;
wherein activation of the inflator causes the airbag to inflate and break through the line of weakness,
wherein the lower member includes an inner surface facing the cavity and an opposed outer surface, the inner surface defining the line of weakness, and
an inflator fluidly sealed coupling configured to deliver gas from the inflator to the airbag, wherein the inflator fluidly sealed coupling is rotatably coupled to the hinge such that the inflator fluidly sealed coupling rotates as the tray table rotates between the vertical orientation and horizontal orientation,
wherein the hinge includes a cylindrical hinge pin, and wherein the tray table and the inflator fluidly sealed coupling include respective hinge members rotatably coupled to the hinge pin.

10. The assembly of claim 9, wherein the inflator is mounted to the tray table within the cavity.

11. The assembly of claim 9, wherein the inflator is mounted within a seating unit of a passenger airplane.

12. The assembly of claim 9, wherein the line of weakness is a plurality of intersecting lines of weaknesses in a general shape of an "H".

\* \* \* \* \*